(12) United States Patent
Balakrishnan et al.

(10) Patent No.: US 9,081,504 B2
(45) Date of Patent: Jul. 14, 2015

(54) WRITE BANDWIDTH MANAGEMENT FOR FLASH DEVICES

(75) Inventors: Ganesh Balakrishnan, Apex, NC (US); Anil Krishna, Cary, NC (US)

(73) Assignee: Lenovo Enterprise Solutions (Singapore) Pte. Ltd., New Tech Park (SG)

(*) Notice: Subject to any disclaimer, the term of this patent is extended or adjusted under 35 U.S.C. 154(b) by 392 days.

(21) Appl. No.: 13/339,685

(22) Filed: Dec. 29, 2011

(65) Prior Publication Data

US 2013/0173843 A1     Jul. 4, 2013

(51) Int. Cl.
G06F 13/37    (2006.01)
G06F 3/06     (2006.01)
G06F 9/50     (2006.01)

(52) U.S. Cl.
CPC ............ G06F 3/0613 (2013.01); G06F 3/0659 (2013.01); G06F 3/0679 (2013.01); G06F 9/5016 (2013.01)

(58) Field of Classification Search
CPC ............ G06F 12/109; G06F 2201/865; G06F 3/0659; G06F 3/0679; G06F 9/5016; G06F 13/37; G06F 2221/0711; G06F 2221/2141; G06F 9/45533; G06F 3/0631; G06F 9/45558; G06F 9/50
See application file for complete search history.

(56) References Cited

U.S. PATENT DOCUMENTS

| | | | |
|---|---|---|---|
| 7,711,789 B1* | 5/2010 | Jnagal et al. | 709/213 |
| 8,291,170 B1* | 10/2012 | Zhang et al. | 711/135 |
| 2007/0283115 A1* | 12/2007 | Freeman et al. | 711/163 |
| 2008/0209076 A1 | 8/2008 | Wang et al. | |
| 2009/0172253 A1 | 7/2009 | Rothman et al. | |
| 2010/0083247 A1 | 4/2010 | Kanevsky et al. | |
| 2011/0197039 A1 | 8/2011 | Green et al. | |

FOREIGN PATENT DOCUMENTS

| | | |
|---|---|---|
| EP | 001679585 | 7/2006 |
| KR | 2006000193 | 1/2006 |

OTHER PUBLICATIONS

William K. Josephson et al, "DFS: A file system for virtualized flash storage", ACM Transactions on Storage, vol. 6, No. 3, Sep. 2010.

* cited by examiner

*Primary Examiner* — Cheng-Yuan Tseng
*Assistant Examiner* — Candice Rankin
(74) *Attorney, Agent, or Firm* — Steven M. Greenberg, Esq.; CRGO Law

(57) ABSTRACT

Embodiments of the present invention provide a flash memory device write-access management amongst different virtual machines (VMs) in a virtualized computing environment. In one embodiment, a virtualized computing data processing system can include a host computer with at least one processor and memory and different VMs executing in the host computer. The system also can include a flash memory device coupled to the host computer and accessible by the VMs. Finally, a flash memory controller can manage access to the flash memory device. The controller can include program code enabled to compute a contemporaneous bandwidth of requests for write operations for the flash memory device, to allocate a corresponding number of tokens to the VMs, to accept write requests to the flash memory device from the VMs only when accompanied by a token and to repeat the computing, allocating and accepting after a lapse of a predetermined time period.

6 Claims, 2 Drawing Sheets

WRITE BANDWIDTH MANAGEMENT FOR FLASH DEVICES

BACKGROUND OF THE INVENTION

1. Field of the Invention

The present invention relates to flash memory device reliability and more particularly to flash memory write cycle bandwidth management.

2. Description of the Related Art

Flash memory refers to non-volatile computer readable storage medium that can be electrically erased and reprogrammed. Flash memory initially had been developed from electrically erasable programmable read-only memory and stores information in an array of memory cells made from floating-gate transistors. In traditional single-level cell devices, each cell of flash memory stores only one bit of information. Newer flash memory, known as multi-level cell devices, can store more than one bit per cell by choosing between multiple levels of electrical charge to apply to the floating gates of its cells.

Flash cells of a flash memory device can provide only a finite number of erase cycles. When the number of erases in the flash memory device exceeds this limit, the cell fails and eventually, the flash memory device fails. Flash memory devices are also capable of very high performance, which in effect, accelerates the end of life of the flash memory device. Flash memory devices also provide a warranty which guarantee reliable operation for a finite duration of time. Of note, it is well within the performance envelope to exceed the number of erase cycles of a flash memory device within the warranty period. Thus, in order to meet warranty requirements, flash memory devices may throttle write transactions. By slowing down the write transactions, the number of erase transactions is reduced, thus increasing the lifetime of the flash memory device.

In a virtual environment in which multiple virtual machines (VMs) execute in the physical memory of one or more computing systems, a single flash memory device may be shared by multiple VMs. So much is not a problem so long as the available write bandwidth of the flash memory device exceeds the bandwidth required by all of the VMs. However, as the available bandwidth of the flash memory decreases during write transaction throttling, a resource sharing issue can arise. Today, the limited write bandwidth of a flash memory device is not intelligently partitioned among the VMs. Instead, in a conventional VM-agnostic flash memory device controller, the write bandwidth remains a resource that is freely available to any VM demanding the write access to the flash memory device. This leads to a situation where the most aggressive VM is provided all or most of the available write bandwidth of the flash memory device, potentially leaving other VMs starving for access to the flash memory device.

BRIEF SUMMARY OF THE INVENTION

Embodiments of the present invention address deficiencies of the art in respect to flash memory device access management in a virtualized environment and provide a novel and non-obvious method, system and computer program product for flash memory device write-access management amongst different VMs in a virtualized computing environment. In an embodiment of the invention, a virtualized computing data processing system can include a host computer with at least one processor and memory and different VMs executing in the host computer. The system also can include a flash memory device coupled to the host computer and accessible by the VMs. Finally, a flash memory controller can manage access to the flash memory device. The controller can include program code enabled to compute a contemporaneous bandwidth of requests for write operations for the flash memory device, to allocate a corresponding number of tokens to the VMs, to accept write requests to the flash memory device from the VMs only when accompanied by a token and to repeat the computing, allocating and accepting after a lapse of a pre-determined time period.

In one aspect of the embodiment, the program code of the controller further detects the lapse of the predetermined time period, and in response to the detecting of the lapse reallocates unused tokens in over-allocated ones of the VMs to under-allocated ones of the VMs for use during a subsequent pre-determined time period. In another aspect of the embodiment the program code of the controller further identifies ones of the VMs experiencing a burst of requests to write to the flash memory device and allocates in response to the identification of VMs experiencing a burst of requests additional tokens to the VMs experiencing a burst of requests.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for flash memory device write-access management amongst different VMs in a virtualized computing environment. In accordance with an embodiment of the invention, a quantity of tokens can be computed corresponding to a measured available write-cycle bandwidth of a flash memory device provided during throttling of the flash memory device. Subsequently, different VMs seeking access to the flash memory device can be allocated an equal number of the quantity of the tokens with which access is granted to institute a write operation on the flash memory device. After an end of a pre-determined period of time, unused tokens allocated to one or more of the VMs can be redistributed to VMs identified as lacking enough tokens to institute all desired write operations and the process can repeat. During the pre-determined period of time, VMs demonstrating a burst of required write access to the flash memory device can be allocated additional tokens on a temporary basis. In this way, write access to the flash memory device can be intelligently and fairly managed in a virtualized environment despite throttling performed by the flash memory device.

Figure 1:
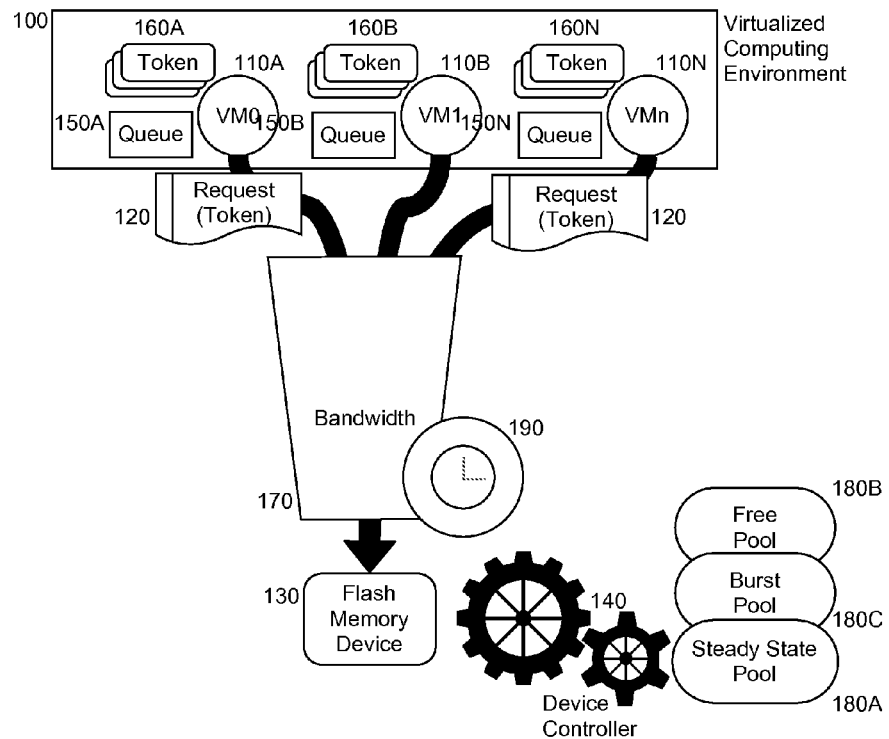
FIG. 1 is a pictorial illustration of a process for flash memory device write-access management amongst different VMs in a virtualized computing environment.

In more particular illustration, FIG. 1 shows a process for flash memory device write-access management amongst different VMs in a virtualized computing environment. As shown in FIG. 1, different VMs 110A, 110B, 110N of a virtualized computing environment 100 can request write operations in a flash memory device 130 of the virtualized computing environment 100. Each write request 120 issued by a corresponding one of the VMs 110A, 110B, 110N can be tracked within a corresponding request queue 150A, 150B, 150N and can be accompanied by a token 160A, 160B, 160N. A device controller 140 can manage access to the flash memory device 130 and can grant a request 120 issued by a VM 110A, 110B, 110N only if the request 120 is accompanied by a token 160A, 160B, 160N.

Of note, the device controller 140 can maintain a steady state pool of tokens 180A, a free pool of tokens 180B and a burst pool of tokens 180C. The steady state pool of tokens 180A can include a number of tokens equivalent to a determined bandwidth 170 of the flash memory device 130 in respect to a number of write requests able to be accommodated by the flash memory device 130 irrespective of throttling established by the flash memory device 130. An additional number of tokens can be provided for the burst pool of tokens 180C. The device controller 140 initially can allocate the tokens in the steady state pool of tokens 180A evenly amongst the VMs 110A, 110B, 110N.

Thereafter, when a pre-determined period of time, namely an epoch 190, has passed, unused tokens 160A, 160B, 160N provided to the VMs 110A, 110B, 110N can be placed in the free pool of tokens 180B for use by ones of the VMs 110A, 110B, 110N that suffer a deficiency of tokens 160A, 160B, 160N to satisfy desired write operations in the flash memory device 130. During a sub-period of the epoch 190, the queues 150A, 150B, 150N can be monitored to identify VMs 110A, 110B, 110N demonstrating an enhanced number of requests 120 for write operations in the flash memory device 130. In response, tokens from the burst pool of tokens 180C can be provided to those of the VMs 110A, 110B, 110N demonstrating an enhanced number of requests 120 for write operations in the flash memory device 130.

Figure 2:
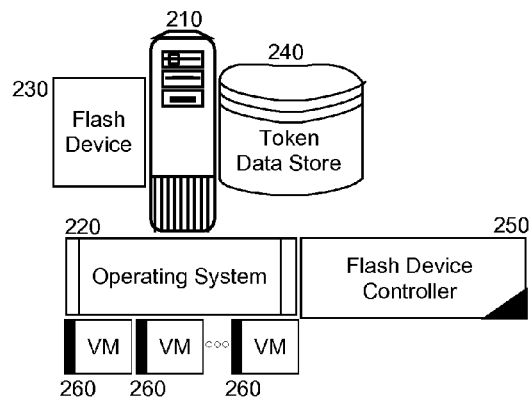
FIG. 2 is a schematic illustration of a flash memory data processing system configured for write-access management amongst different VMs in a virtualized computing environment.

The process described in connection with FIG. 1 can be implemented in a flash memory data processing system. In yet further illustration, FIG. 2 is a schematic illustration of a flash memory data processing system configured for write-access management amongst different VMs in a virtualized computing environment. The system can include a host computer 210 with at least one processor and memory. The host computer 210 can support the execution of an operating system 220 which in turn can manage the operation of different VMs 260. A flash device 230 can be coupled to the host computer 210 and can provide a fixed storage medium for use by the VMs 260. A flash device controller 250 can be provided to manage access requests by the VMs 260 to the flash device 230 and in particular, write operation requests by the VMs 260.

Figure 3:
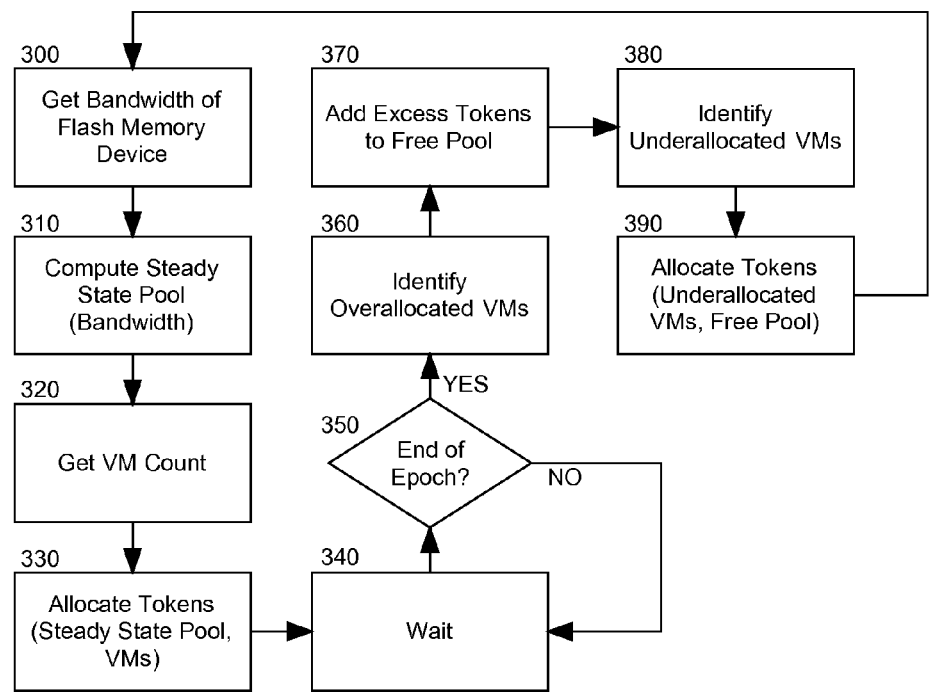
FIG. 3 is a flow chart illustrating a process for steady-state flash memory device write-access management amongst different VMs in a virtualized computing environment; and, FIG. 4 is a flow chart illustrating a process for burst-state flash memory device write-access management amongst different VMs in a virtualized computing environment.

Notably, the flash device controller 250 can include program code enabled upon execution by the host computer 210 to compute a number of tokens for placement in a token data store 240, to distribute the tokens to the VMs 260 and to permit write operation access to the flash memory device 230 only when such a request by a corresponding one of the VMs 260 is accompanied by a token. In yet further illustration of the operation of the flash device controller 250, FIG. 3 is a flow chart illustrating a process for steady-state flash memory device write-access management amongst different VMs in a virtualized computing environment.

Beginning in block 300, the available bandwidth of the flash memory device can be retrieved, for example by contemporaneously monitoring a number of I/O operations or write operations accepted by the flash memory device over a set period of time. In block 310, a pool of steady state tokens can be populated in accordance with the bandwidth and in block 320, a count of a number of VMs active in the virtualized environment can be determined. Thereafter, in block 330 the tokens in the steady state pool can be allocated evenly across the VMs for use by the VMs whenever a memory write operation is required in respect to the flash memory device.

In block 340, a delay can be incurred and in decision block 350, it can be determined whether a predetermined period of time—namely an epoch—has transpired. If so, in block 360, those of the VMs with tokens remaining and unused can be identified as VMs which received an unnecessary over-allocation of tokens and those tokens can be placed into a free pool of tokens in block 370. Additionally, in block 380, request queues for write operation requests of the VMs can be inspected to identify VMs which are likely not to have enough tokens to satisfy desired requests for write operations on the flash memory device. Subsequently, in block 390 tokens from the free pool of tokens can be allocated to those of the VMs determined to have been under-allocated. Finally, the process can repeat in block 300 with a new determination of the contemporaneous bandwidth of the flash memory device.

Figure 4:
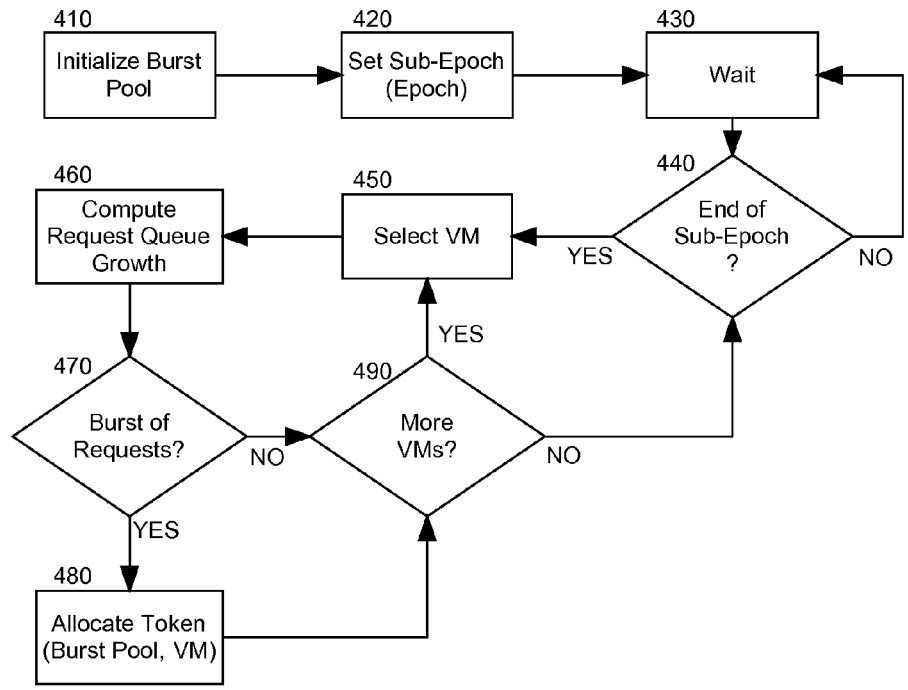

At sub-intervals of the epoch, a determination can be made of any VMs requiring tokens from the burst pool of tokens. In more particular illustration, FIG. 4 is a flow chart illustrating a process for burst-state flash memory device write-access management amongst different VMs in a virtualized computing environment. Beginning in block 410, a burst pool of tokens can be initialized to include a selection of tokens and in block 420, a sub-interval of the epoch can be determined. In block 430, a delay can be incurred and in decision block 440, if the sub-interval has elapsed, in block 450 a first VM can be selected for analysis.

In block 460, the request queue of the selected VM can be inspected to determine the rate of additions of requests to the queue. In decision block 470, if the rate of request growth in the request queue has exceeded a threshold value, in block 480 one or more tokens in the burst pool of tokens can be allocated to the selected VM for use only once before being returned to the burst pool of tokens. Thereafter, in decision block 490, if more VMs remain to be analyzed, the process can repeat in block 450 for a next selected VM. Otherwise, again it can be determined if a next sub-interval has lapsed and the process can begin anew.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A virtualized computing data processing system comprising:
   a host computer with at least one processor and memory;
   a plurality of virtual machines (VMs) executing in the host computer;
   a flash memory device coupled to the host computer and accessible by the VMs; and,
   a flash memory controller managing access to the flash memory device, the controller comprising program code enabled to compute a contemporaneous bandwidth of requests for write operations for the flash memory device, to allocate a corresponding number of tokens to the VMs, to accept write requests to the flash memory device from the VMs only when accompanied by a token and to repeat the computing, allocating and accepting after a lapse of a pre-determined time period.

2. The system of claim 1, wherein the program code of the controller further detects the lapse of the predetermined time period, and in response to the detecting of the lapse reallocates unused tokens in over-allocated ones of the VMs to under-allocated ones of the VMs for use during a subsequent pre-determined time period.

3. The system of claim 1, wherein the program code of the controller further identifies ones of the VMs experiencing a burst of requests to write to the flash memory device and allocates in response to the identification of VMs experiencing a burst of requests additional tokens to the VMs experiencing a burst of requests.

4. A computer program product for flash memory device write-access management method for different virtual machines (VMs) in a virtualized computing environment, the computer program product comprising:
   a non-transitory computer readable memory device having non-transitory computer readable program code embodied therewith, the non-transitory computer readable program code comprising: non-transitory computer readable program code for computing a contemporaneous bandwidth of requests for write operations for a flash memory device; non-transitory computer readable program code for allocating a corresponding number of tokens to virtual machines (VMs) in a virtualized computing environment seeking write access to the flash memory device; non-transitory computer readable program code for accepting write requests to the flash memory device from VMs only when accompanied by a token; and, non-transitory computer readable program code for repeating the computing, allocating and accepting after a lapse of a pre-determined time period.

5. The computer program product of claim 4, further comprising:
   non-transitory computer readable program code for detecting the lapse of the predetermined time period; and, non-transitory computer readable program code for re-allocating in response to the detecting of the lapse unused tokens in over-allocated ones of the VMs to under-allocated ones of the VMs for use during a subsequent pre-determined time period.

6. The computer program product of claim 4, further comprising:
   non-transitory computer readable program code for identifying ones of the VMs experiencing a burst of requests to write to the flash memory device; and, non-transitory computer readable program code for allocating in response to the identification of VMs experiencing a burst of requests, additional tokens to the VMs experiencing a burst of requests.

* * * * *